H. G. Ludlow,
Sliding Stop-Valve

4250

REISSUED JAN 31 1871

Witnesses:
A. W. Hamilton Johnson
Francis A. Hamilton

Inventor:
Henry G. Ludlow,
By his Attorneys,
Uppenman & Johnson.

Sheet, 2.

H. G. Ludlow,
Sliding Stop-Valve.

Witnesses;
A. W. Hamilton Johnson
L. H. Hamilton

Inventor;
Henry G. Ludlow
By his Attorneys,
Upperman & Johnson

United States Patent Office.

HENRY G. LUDLOW, 2D, OF TROY, NEW YORK, ASSIGNOR TO LUDLOW VALVE-MANUFACTURING COMPANY, OF SAME PLACE.

Letters Patent No. 33,309, dated September 17, 1861; reissue No. 4,250, dated January 31, 1871.

IMPROVEMENT IN SLIDING STOP-VALVES.

The Schedule referred to in these Letters Patent and making part of the same.

*To all whom it may concern:*

Be it known that I, HENRY G. LUDLOW, 2d, formerly of Waterford, in the county of Saratoga and State of New York, but now of Troy, in the county Rensselaer and State aforesaid, have invented certain new and useful Improvements in Sliding Stop-Valves; and I do hereby declare that the following is a full, clear, and exact description thereof, which will enable those skilled in the art to which my invention appertains to make and use the same, reference being had to the accompanying drawing, which makes part of this specification, and in which—

Similar letters of reference indicate corresponding parts in the several figures.

Prior to my invention there were, so far as I am aware, but two forms of sliding stop-valves in use—one of these valves having a gate with parallel sides moving between two parallel seats, and having no means of forcing or impelling the gate to its seat except the pressure of the fluid against its back side, the other having a solid wedging gate moving between two fixed seats having the same inclination as the gate, and being driven to close contact with its seats by the stem. In this valve the great friction of the wedging surfaces was found to be a serious objection, frequently causing the valve to be broken, and its constant liability to bind or stick rendered it difficult to open. Moreover, it was found very difficult, in manufacturing this form of valve, to get the wedging valve-faces in line, and thus liable to be loose at the top or bottom, and, therefore, leak. My invention obviates these difficulties; and It consists—

First, in constructing a sliding stop-valve so that the gate is made separate from the wedge and stem, or the wedge or wedges made separate from the gate and stem.

Second, in constructing a sliding stop-valve with its gate, wedge or wedges, and stem made in separate and distinct parts, and operating in connection with each other to produce the desired results in any convenient manner.

Third, in constructing the bearing surfaces of the gate and wedge so that the latter will have the capacity to rock or accommodate itself to the gate and inclined surface or surfaces upon which the wedge or wedges act.

Fourth, the junction or uniting of the gate and wedge by means which allow the gate or wedge to have a movement independent each of the other, for the purpose of relieving the gate from pressure of the wedge, either in opening or closing.

The box or casing A, of the valve, is provided at opposite sides with openings, *a* and *e*, either of which may be surrounded by a flat seat, *b*, against which the valve closes, and having on the opposite side one or more inclined surfaces, to form a bearing or bearings for the wedge or wedges C *d*, to produce the required action upon the valve.

The gate B has one side faced to fit the seat *b*, while the other is in contact with the wedge or wedges.

The gate B is supplied with one or more projections, *n*, on its side contiguous to the wedge or wedges, by means of which projection or projections the wedge or wedges press the gate to its seat, and in doing so allows it to partially rock or accommodate itself to the inclines *c* and the gate, and thus obviate the necessity and expense of accurate fitting. The projection or projections, however, may be made on the wedge or wedges instead of on the gate, and answer the same purpose.

Figure 1:
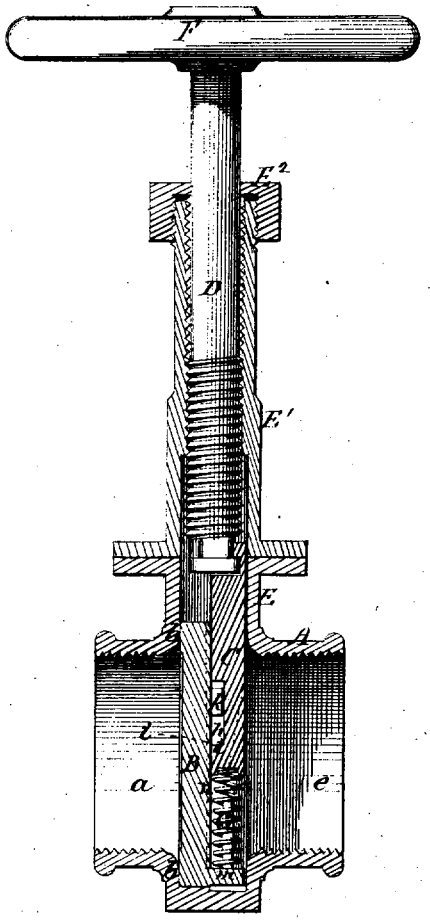
Figures 1 and 2 represent vertical sectional views, taken at right angles to each other, of a valve embracing my invention.
Figure 2:
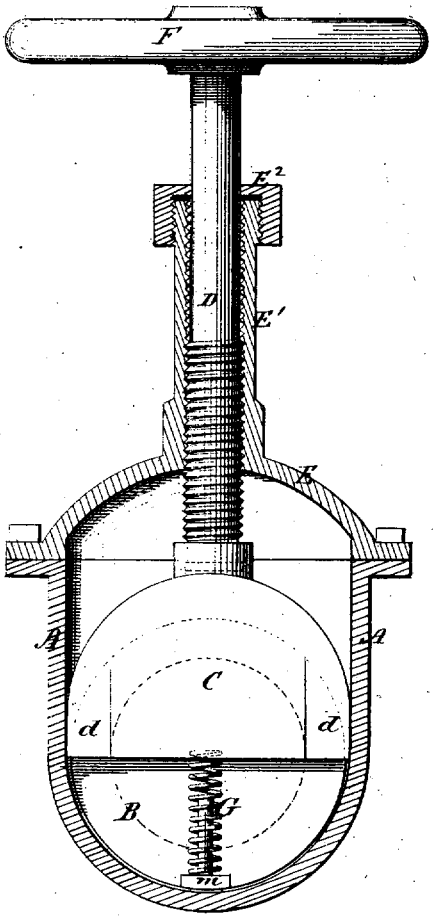
Figure 3:
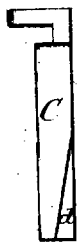
Figure 3 represents a side view of the wedge or wedges.
Figure 4:
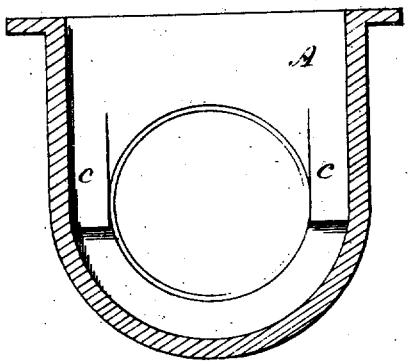
Figure 4 represents an inside view of the back of the valve-casing.
Figure 5:
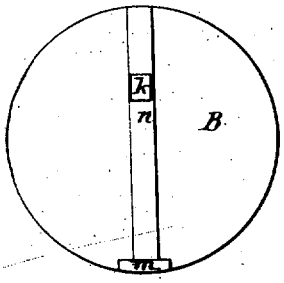
Figure 5 represents an elevation of the back side of the gate with its projection.
Figure 6:
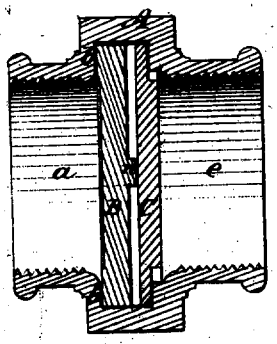
Figure 6, a cross-section through the valve-casing, gate, and wedge, taken through the inlet and outlet-openings at right angles to the axis of the stem.

The connection between the gate and the wedge or wedges C *d* is made, in the example shown in the drawing, by means of a projection, *k*, on the gate, fitting loosely in a recess, *h*, fig. 1, in the wedge, for the purpose of permitting a certain degree of play of the wedge and gate on each other. This play of the wedge is an important feature, because in opening the gate it allows the gate-mover or wedge to start before the gate, and thus relieves the latter in a great measure from friction with the seat, and, to a considerable extent, this advantage is obtained in closing the gate.

The gate B is opened and closed by a screw or sliding stem, D, which carries at its lower end a wedge or wedges, by which the gate is pressed to its seat.

This stem passes through a cap, E, sleeve, $E^1$, and stuffing-box, $E^2$, or equivalent devices; and it is provided at its upper end with a hand-wheel, F, or other handle, by which the said stem is operated.

A spring, G, may be applied between the wedge and a projection, *m*, on the lower part of the gate, for the purpose of assisting to prevent the wedge or wedges from pinching before the gate is closed, and of relieving the gate from the pressure of the wedge in commencing to open it.

The operation of the gate and wedge or wedges is as follows:

When the gate is closed it is held to its seat *b* by the direct action and pressure of the wedge or wedges. To open the gate the stem D is moved outward, starting the wedge C *d*, the gate remaining in position upon its seat until the shoulder *i* or other device strikes the projection *k* or other device; but as soon as the wedge C *d* starts the gate begins to be relieved from its pressure. By this action much of the friction of the gate and seat is prevented. In closing the gate it will ordinarily close before the pressure of the wedge or wedges upon it commences. This independent play of the wedge or wedges in opening and closing the gate is an important feature and advantage of my invention.

The gate may be so constructed and arranged as to open a vent while being closed, and thereby let out the water, thus preventing freezing, and enabling the valve to be used as a hydrant.

Instead of using two wedges *d* and two inclined projections *c* in the valve-box, a single wedge and a single inclined projection may be sufficient.

I have described and represented a single gate held to its seat by a wedge or wedges, and operated by a stem, but it is obvious that two gates, or their equivalents, may be employed to produce the same results with one and the same stem, without departing from the spirit of my invention, so long as the functions performed by the wedge, gate, and stem separately, or in conjunction with each other, are essentially such as hereinbefore described.

My improved stop-valve possesses, among other advantages, the following, to wit: facility to grind the gate to its seat, by removing the wedge or wedges; avoiding a large part of the friction caused by the largely-increased bearing surfaces of the solid wedging valve-gate; the saving of much labor and expense in accurately fitting the gate, wedge or wedges, and incline or inclines, by reason of the rocking and accommodating capacity of the wedge or wedges, relieving the gate from friction in opening and closing it, by the play of the wedge; and the increased facility for repairing the several parts of the valve, or removing and replacing the several parts in position when, from any cause, it may be deemed necessary to do so.

Having described my invention,

I claim—

1. In a sliding stop-valve, the gate B, made separate from the wedge or wedges C *d*, as described.

2. In a sliding stop-valve, the wedge or wedges C *d*, made separate from the gate B and stem D, as described.

3. The combination of the gate B, stem D, and wedge or wedges C *d*, in three or more separate parts, whether the stem be connected directly with the gate or wedge.

4. The gate and wedge, connected or united to each other so as to allow the wedge to play loosely upon the back of the gate, and have a movement independent of the gate, essentially as described.

5. The bearing *n* between the gate and wedge, for the purpose of allowing the wedge to rock or accommodate itself to the gate and inclined surface or surfaces, as described.

6. In a sliding stop-valve, the combination of the gate B, the wedge or wedges C *d*, the incline or inclines *c*, the bearing surface *n*, the recess *h*, projection *k*, and the inlet and outlet-openings *a* and *e* of the valve-case, constructed and operating essentially as described.

In testimony whereof I have hereunto set my hand.

HENRY G. LUDLOW, 2D.

Witnesses:

A. E. H. JOHNSTON,
T. H. UPPERMAN.